(12) United States Patent
Lu et al.

(10) Patent No.: US 11,582,772 B2
(45) Date of Patent: Feb. 14, 2023

(54) ADVANCED DUAL BAND VIRTUAL CONCURRENT FOR WIFI

(71) Applicant: SEMICONDUCTOR COMPONENTS INDUSTRIES, LLC, Phoenix, AZ (US)

(72) Inventors: Ying Lu, Eastwood (AU); Richard Kinder, Eastwood (AU)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 33 days.

(21) Appl. No.: 16/882,319

(22) Filed: May 22, 2020

(65) Prior Publication Data

US 2021/0058943 A1 Feb. 25, 2021

Related U.S. Application Data

(60) Provisional application No. 62/969,229, filed on Feb. 3, 2020, provisional application No. 62/890,970, filed on Aug. 23, 2019.

(51) Int. Cl.
*H04W 4/00* (2018.01)
*H04W 72/12* (2023.01)
(Continued)

(52) U.S. Cl.
CPC ........ *H04W 72/1205* (2013.01); *H04B 7/155* (2013.01); *H04W 48/10* (2013.01); *H04W 84/12* (2013.01)

(58) Field of Classification Search
CPC ............. H04W 48/10; H04W 72/1205; H04W 74/002; H04W 74/04; H04W 84/12; H04W 88/085
See application file for complete search history.

(56) References Cited

U.S. PATENT DOCUMENTS 9,112,588 B2 *  8/2015  Florentinus de Maaijer ...............
 H04W 88/06
2011/0317679 A1 * 12/2011  Jain ....................... H04W 88/10
 370/338

(Continued)

FOREIGN PATENT DOCUMENTS

KR  1020150095084 A  8/2015

OTHER PUBLICATIONS

Dr. Sigurd Schelstraete, "Dual-Band 11AX," Quantenna Communications, Inc. White Paper, Jan. 2018, 13 pages.
(Continued)

*Primary Examiner* — Khalid W Shaheed
(74) *Attorney, Agent, or Firm* — Maschoff Brennan

(57) ABSTRACT

Example methods of advanced DBVC for WiFi relate to one or more of avoiding beacon collisions between a repeater and a root AP, optimizing traffic flows based on buffers queued within hardware, optimizing TCP throughput through DPI and prioritization of TCP ACK packets, or optimizing transmissions through a trigger-based mechanism.
An example method may include receiving a transmission from a root AP. The method may include obtaining a next root AP TBTT of a next beacon to be sent by the root AP from the transmission. The method may include determining an amount of time to delay a next repeater TBTT of a next beacon to be sent by a repeater to avoid conflict between the next root AP TBTT and the next repeater TBTT. The method may include delaying the next repeater TBTT based on the determined amount of time.

24 Claims, 7 Drawing Sheets

(51) Int. Cl.
*H04W 48/10* (2009.01)
*H04B 7/155* (2006.01)
*H04W 84/12* (2009.01)

(56) References Cited

U.S. PATENT DOCUMENTS

2013/0044739 A1* 2/2013 Huang .............. H04W 52/0216
370/338
2015/0180530 A1* 6/2015 Florentinus de Maaijer ...............
H04B 1/005
375/219
2020/0221344 A1* 7/2020 Jeon ................. H04W 28/0284

OTHER PUBLICATIONS

German Search Report, as issued in connection with German Application No. 102020121933.4, dated Aug. 21, 2020, 10 pgs.

* cited by examiner

ADVANCED DUAL BAND VIRTUAL CONCURRENT FOR WIFI

CROSS-REFERENCE TO RELATED APPLICATIONS

This patent application claims the benefit of and priority to U.S. Provisional App. No. 62/890,970 filed Aug. 23, 2019 titled "METHODS AND SYSTEMS TO OPTIMIZE DBVC PERFORMANCE FOR THROUGHPUT AND STABILITY" and to U.S. Provisional App. No. 62/969,229 filed Feb. 3, 2020 titled "ADVANCED DUAL BAND VIRTUAL CONCURRENT FOR WIFI NETWORKS". The 62/890,970 provisional application and the 62/969,229 provisional application is each incorporated in the present disclosure by reference in its entirety.

FIELD

The implementations discussed herein relate to advanced dual band virtual concurrent (DBVC) for WiFi.

BACKGROUND

Unless otherwise indicated in the present disclosure, the materials described in the present disclosure are not prior art to the claims in the present application and are not admitted to be prior art by inclusion in this section.

DBVC for WiFi, also sometimes referred to as Virtual Concurrent Dual Band (VCDB), is a time division multiple access (TDMA)-type protocol which typically applies on top of a WiFi connection, to provide dual band operations on a device which contains only a single radio. The DBVC protocol works by dividing time into on channel periods of time and off channel periods of time to support both an access point (AP) role and a wireless station (STA) role in a network. In more detail, a repeater in a WiFi network may service clients or a downlink during the on channel periods of time during which the repeater acts as an AP and may therefore be referred to as a repeater AP when in this role. Further, the repeater may service an uplink or root AP during the off channel periods of time during which the repeater acts as a STA and may therefore be referred to as a repeater STA when in this role.

Problems associated with DBVC operation include scheduling issues, optimization of performance in a time divided network, and timing/resource clashes which can cause link instability. Additional problems may exist when interoperating with various third-party devices (such as legacy WiFi clients), whereby certain standards-based and proprietary operations which are useful to provide a seamless WiFi experience are not supported. The overall goal for a DBVC system is to lower the total cost of a WiFi system such as an industrial repeater by removing the need for two separate physical radios on a given frequency band, while providing the best support for legacy devices which do not support more advanced channel management features such as Channel Switch Announcement (CSA).

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an implementation a method may include receiving, by a repeater configured to communicate according to a DBVC protocol, a transmission from a root AP. The method may include obtaining a next root AP target beacon transmission time (TBTT) of a next beacon to be sent by the root AP from the transmission. The method may include determining an amount of time to delay a next repeater TBTT of a next beacon to be sent by the repeater to avoid conflict between the next root AP TBTT and the next repeater TBTT. The method may include delaying the next repeater TBTT based on the determined amount of time.

In another implementation, a method may include determining a load on an upstream buffer within a repeater that is configured to communicate according to a DBVC protocol. The load on the upstream buffer may correspond to data to be transmitted within an upstream network. The method may include determining a load on a downstream buffer within the repeater that corresponds to data to be transmitted within a downstream network. The method may include determining whether to adjust DBVC duty cycles of the repeater based on the load on the upstream buffer and the load on the downstream buffer. The method may include adjusting the DBVC duty cycles of the repeater.

In another implementation, a method may include determining traffic is to be transmitted by a first wireless communication device to a second wireless communication device configured to communicate according to a DBVC protocol during a period of time that the second wireless communication device is not to perform operations on a first channel. The method may include switching to a second channel. The method may include providing a trigger frame to the second wireless communication device over the second channel. The method may include receiving an acknowledge (ACK) frame from the second wireless communication device. The ACK frame may be sent by the second wireless communication device to the first wireless communication device in response to the second wireless communication device receiving the trigger frame. The method may include transmitting data to the second wireless communication device over the second channel. The method may include transmitting an end frame to the second wireless communication device over the second channel. The method may include switching to the first channel in response to transmitting the end frame.

In another implementation, a method may include performing deep packet inspection (DPI) to observe, at a repeater that is configured to communicate according to a DBVC protocol, transmission control protocol (TCP) connections through the repeater and TCP window sizes of the TCP connections. The method may include setting or adjusting an on/off channel dwell time of the repeater based on the TCP window sizes of the TCP connections.

BRIEF DESCRIPTION OF THE DRAWINGS

Example implementations will be described and explained with additional specificity and detail through the use of the accompanying drawings in which.

DETAILED DESCRIPTION

Figure 1:
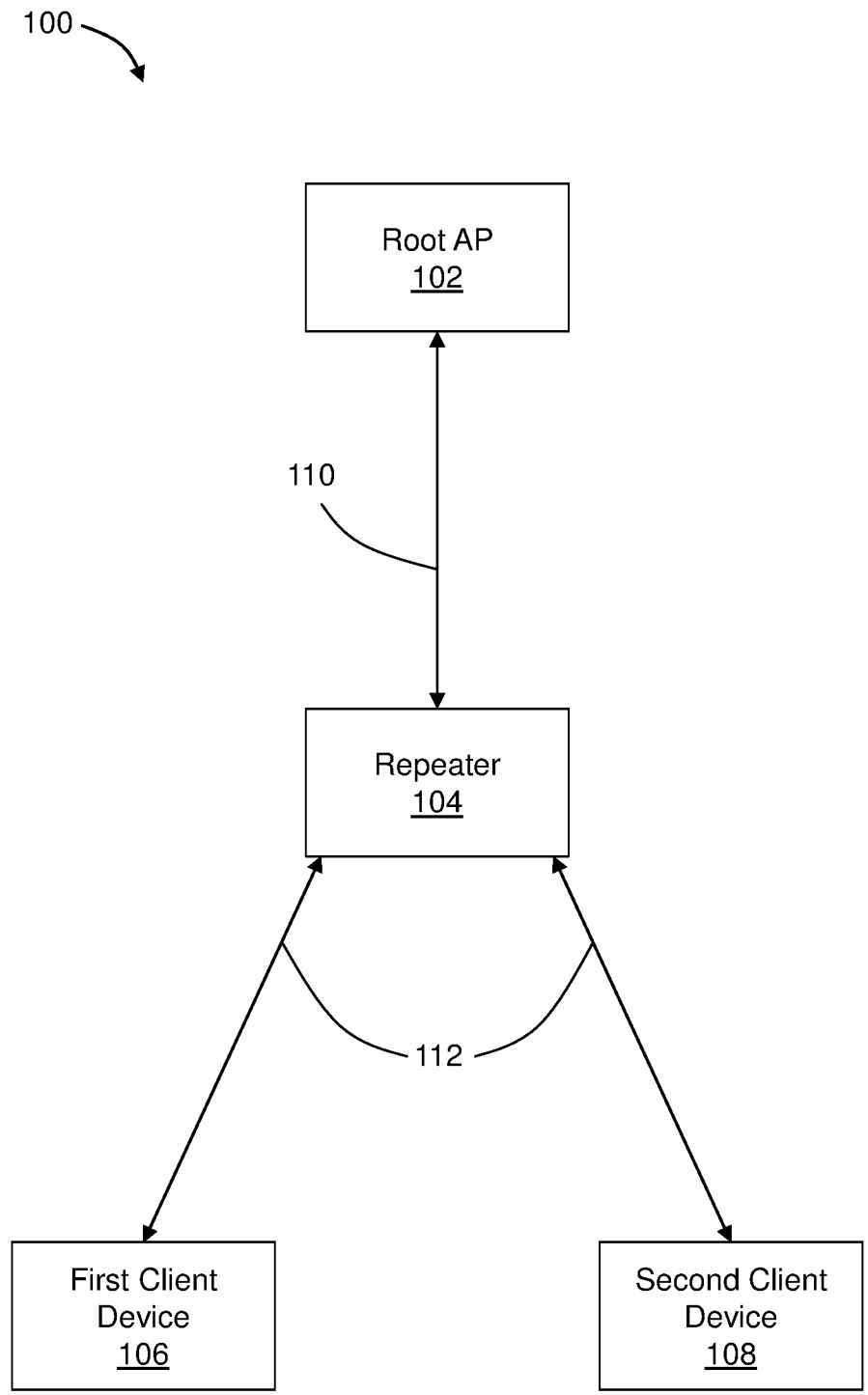
FIG. 1 is a block diagram of an example operational environment to implement a DBVC protocol.

Some implementations described herein address one or more problems typically associated with DBVC operation in WiFi networks, such as scheduling issues, optimization of performance in a time divided network, timing/resource clashes which can cause link instability, and interoperation with third-party devices. These and other implementations may be implemented by a repeater configured to communicate according to a DBVC protocol.

For example, some example implementations avoid beacon collisions between a repeater and a root AP. In this and other examples, the repeater may obtain a TBTT of the root AP, may determine an amount of time to delay a TBTT of the repeater to avoid conflict between the repeater's TBTT and the root AP's TBTT, and may delay a next TBTT of the repeater based on the determined amount of time.

Some example implementations may optimize traffic flows based on buffers queued within hardware. In this and other examples, the repeater may have both an upstream buffer and a downstream buffer. The repeater may determine a load on the upstream buffer that may be indicative of data to be transmitted within an upstream network, e.g., on the off channel over the uplink. The repeater may also determine a load on the downstream buffer that may be indicative of data to be transmitted within a downstream network, e.g., on the on channel over the downlink. The repeater may then determine an amount to adjust DBVC duty cycles of the repeater based on the loads on the upstream and downstream buffers and may adjust the DBVC duty cycles accordingly.

Some example implementations may optimize TCP throughput through DPI and prioritization of TCP ACK packets. In this and other examples, the repeater may perform DPI to observe TCP connection through the repeater and TCP window sizes of the TCP connections. In addition, the repeater may set or adjust an on/off channel dwell time of the repeater based on the TCP window sizes of the TCP connections. As a particular example, the repeater may set or adjust the on/off channel dwell time of the repeater to relatively longer on/off channel dwell times in response to an average TCP window size being relatively larger. As another particular example, the repeater may set or adjust the on/off channel dwell time of the repeater to relatively shorter on/off channel dwell times in response to the average TCP window size being relatively smaller. As another particular example, the repeater may set or adjust the on/off channel dwell time of the repeater to relatively shorter on/off channel dwell times in response to the average TCP window size being relatively larger, to throttle the TCP streams. Alternatively or additionally, the repeater may coalesce TCP ACK packets to reduce overhead.

Some example implementations may optimize transmissions through a trigger-based mechanism when both the repeater and the root AP are configured to optimize through the trigger-based mechanism. In this and other examples, a first AP (e.g., the root AP or the repeater as a repeater AP) may determine traffic is to be transmitted by the first AP to a second AP (e.g., the repeater as a repeater AP or the root AP) according to a DBVC protocol during a period of time that the second AP is not to perform operations on a first channel. The first AP may switch to a second channel. The first AP may provide a trigger frame to the second AP. The first AP may determine an ACK frame was received from the second AP in response to the trigger frame. The first AP may transmit data to the second AP on the second channel. The first AP may transmit an end frame to the second AP. Finally, the first AP may switch to the first channel in response to transmitting the end frame.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1 is a block diagram of an example operational environment 100 to implement a DBVC protocol. The operational environment 100 may include a root AP 102, a repeater 104, a first client device 106, and a second client device 108. The root AP 102, the repeater 104, the first client device 106, and the second client device 108 are all examples of wireless communication devices. The repeater 104 may be or include an AP. Alternatively or additionally, the repeater 104 may be or include a STA. In general, the repeater 104 may be configured to receive signals from the root AP 102 over an uplink 110 during an off channel and provide (e.g., repeat) the signals to one or more of the first client device 106 and the second client device 108 over a downlink 112 during an on channel. In addition, the repeater 104 may be configured to receive signals from one or both of the first client device 106 and the second client device 108 over the downlink 112 during the on channel and provide (e.g., repeat) the signals to the root AP 102 over the uplink 110 during the off channel. When receiving signals from or providing signals to the root AP 102 over the uplink 110, the repeater 104 operates as a client device or STA and may be referred to as a repeater STA. When receiving signals from or providing signals to one or both of the first and second client devices 106, 108 over the downlink 112, the repeater 104 operates as an AP and may be referred to as a repeater AP.

In some implementations, the repeater 104 may include a repeater STA side (e.g., a repeater STA interface) and a repeater AP side (e.g., a repeater AP interface). In these and other implementations, the repeater 104 may operate as both a repeater STA and a repeater AP. Alternatively or additionally, the repeater 104 may be configured to perform one or more of the methods or operations described herein.

The root AP 102 and the repeater 104 may implement the IEEE 802.11 standard which is a contention-based standard for handling communications among multiple competing devices for a shared wireless communication medium on a selected one of multiple communication channels. The frequency range of each communication channel is specified in the corresponding one of the IEEE 802.11 protocols being implemented, e.g. "a", "b", "g", "n", "ac", "ad", "ax". In addition, the root AP 102, the repeater 104, the first client device 106, and the second client device 108 may communicate using the DBVC protocol. The DBVC protocol may include an off channel switching protocol.

The DBVC protocol may permit the repeater 104 or the root AP 102 to include single radios but support multiple modes on multiple channels. For example, the root AP 102 may connect to the repeater 104 on a first channel, referred to in the present disclosure as an AP channel or off channel as the first channel may generally be the channel used by the repeater 104 during the off channel durations of time. Further, the repeater 104 may connect to the first client device 106 or the second client device 108 on a second channel, referred to in the present disclosure as a repeater channel or on channel as the second channel may generally be the channel used by the repeater 104 during the on channel durations of time. Thus, the repeater 104 may include a single radio but be capable of communicating on both the AP or off channel and the repeater or on channel. In some implementations, the repeater 104 may switch between channels to simultaneously maintain links (e.g., the uplink 110 and the downlink 112) with the root AP 102, the first client device 106, or the second client device 108. Duty cycles for each of the channels may be adjusted based on traffic or link types.

The DBVC protocol may cause the repeater 104 or the root AP 102 to operate in an on/off channel mode. Some time is spent servicing clients (e.g., STAs of the repeater AP such as the first and second devices 106, 108) over the downlink 112 during the on channel periods of time, and some time is spent servicing the root AP 102 over the uplink 110 during the off channel periods of time. The DBVC protocol is a TDMA type protocol that typically applies on top of a WiFi connection, to provide dual band operations on a device such as the repeater 104 which contains only a single radio on a given frequency band, e.g., 2.4 gigahertz (GHz), 5 GHz or 6 GHz. Other implementations may use licensed spectrum and operate in higher or lower frequency ranges, e.g., 27 GHz, 30 GHz. The DBVC protocol works by dividing time into on and off channel periods of time to support both an AP role and a STA role at the repeater 104 or other DBVC-enabled device in the operational environment 100.

In some implementations, to communicate using the DBVC protocol, the repeater 104 may separate the root AP 102, the first client device 106, or the second client device 108 into different groups associated with different channels. In other implementations, the repeater 104 may designate a particular channel as a VIP channel. In these and other implementations, the repeater 104 may assign VIP devices (e.g., one or more of the root AP 102, the first client device 106, or the second client device 108) to communicate using the VIP channel. In other implementations, the repeater 104 may separate the root AP 102, the first client device 106, or the second client device 108 into different groups based on characteristics of the devices. The characteristics may include one or more of support (or not) for CSA, PHY mode, or lower received signal strength indicator (RSSI). The repeater 104 may switch between the channels to communicate with the root AP 102, the first client device 106, or the second client device 108 on the different channels. The phrase "switch between channels" as used in the present disclosure means the repeater 104 or the root AP 102 may cause the radio to turn off the ability to communicate on a channel (e.g., the off channel) while the radio turns on the ability to communicate on another channel (e.g., the on channel). For example, the repeater 104 may switch between the AP or off channel and the repeater or on channel by causing the radio to turn off the ability to communicate on the AP channel and turn on the ability to communicate on the repeater channel.

Figure 2:
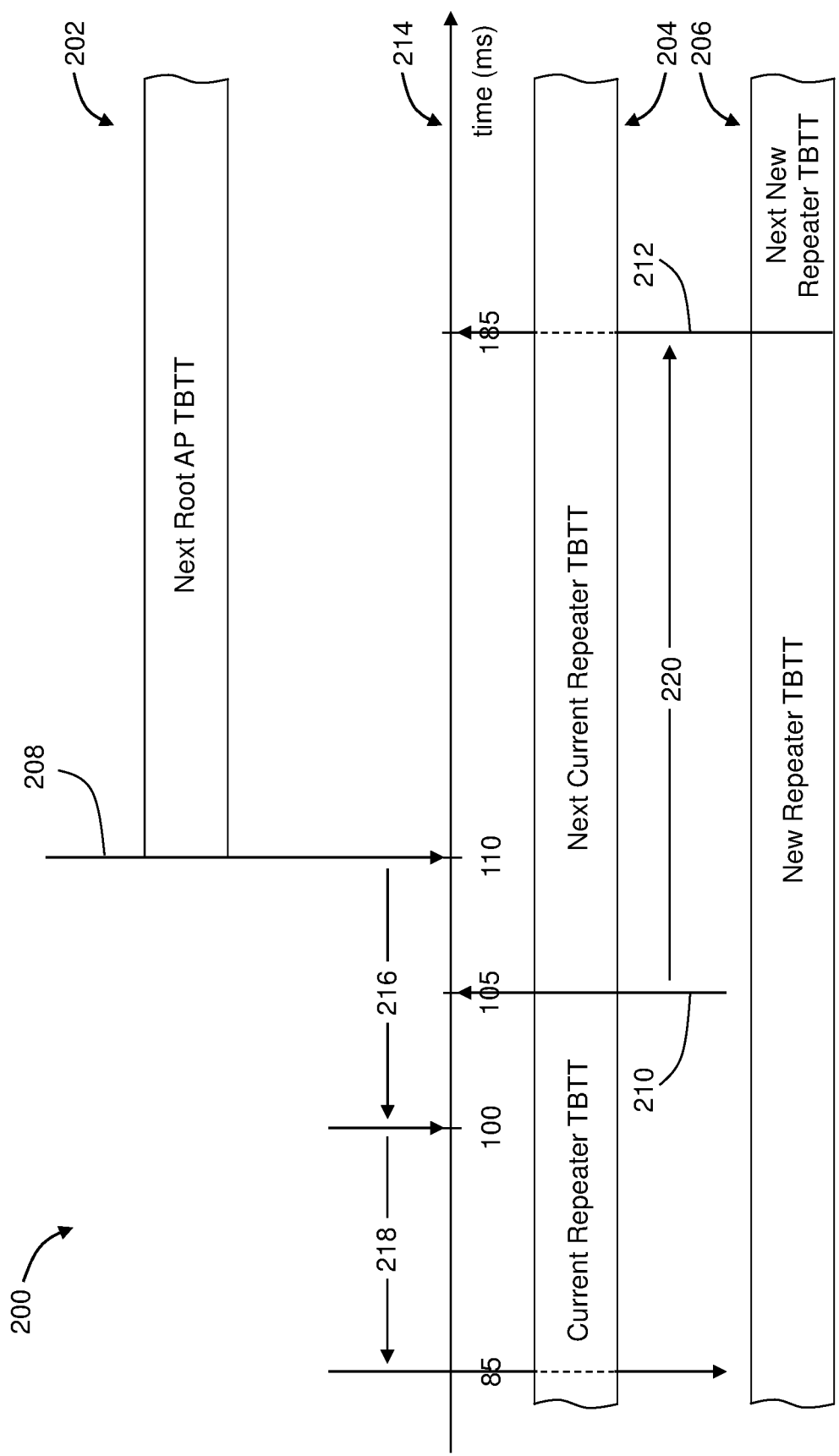
FIG. 2 illustrates an example sequence to avoid beacon collisions between a repeater and a root AP.

FIG. 2 illustrates an example sequence 200 to avoid beacon collisions between a repeater and a root AP, such as between the repeater 104 and the root AP 102 of FIG. 1. In more detail, FIG. 2 illustrates an example current relative alignment between a TBTT schedule 202 of the root AP (hereinafter "root AP TBTT schedule 202") and a current TBTT schedule 204 of the repeater (hereinafter "current repeater TBTT schedule 204"). FIG. 2 also illustrates an example adjusted relative alignment between the root AP TBTT schedule 202 and a new or adjusted TBTT schedule 206 of the repeater (hereinafter "new repeater TBTT schedule 206").

In FIG. 2, solid vertical lines that cross a given one of the TBTT schedules 202, 204, 206 represent a TBTT at which the root AP or repeater is scheduled to transmit a beacon according to the corresponding one of the TBTT schedules 202, 204, 206. For example, a solid vertical line 208 that crosses the root AP TBTT schedule 202 at 110 milliseconds (ms) represents a TBTT of 110 ms at which the root AP is scheduled to transmit its next beacon according to the root AP TBTT schedule 202. Similarly, a solid vertical line 210 that crosses the current repeater TBTT schedule 204 at 105 ms represents a TBTT of 105 ms at which the repeater is scheduled to transmit its next beacon according to the current repeater TBTT schedule 204. Similarly, a solid vertical line 212 that crosses the new repeater TBTT schedule 206 at 185 ms represents a TBTT of 185 ms at which the repeater is scheduled to transmit its next beacon according to the new repeater TBTT schedule 206.

Accordingly, FIG. 2 illustrates that a next TBTT of the root AP (hereinafter "next root AP TBTT") in the root AP TBTT schedule 202 is scheduled for 110 ms along an example timeline 214. More generally, TBTTs of the root AP in the root AP TBTT schedule 202 in this example may be scheduled at time 110 ms+N*$\Delta_{root\ beacon}$ where N is an integer and $\Delta_{root\ beacon}$ is a beacon interval of the root AP (hereinafter "root AP beacon interval"). Thus, if the root AP beacon interval is 100 ms, the TBTTs of the root AP in the root AP TBTT schedule 202 may be scheduled for 110 ms, 210 ms, 310 ms, etc. in this example. Root AP TBTTs that follow the next root AP TBTT shown in FIG. 2 may be referred to as subsequent root AP TBTTs (e.g., for any root AP TBTTs that follow the next root AP TBTT scheduled for 110 ms).

FIG. 2 further illustrates that a next TBTT of the repeater in the current repeater TBTT schedule 204 (hereinafter "next current repeater TBTT") is scheduled for 105 ms along the timeline 214. More generally, TBTTs of the repeater in the current repeater TBTT schedule 204 in this example may be scheduled at time 105 ms+N*$\Delta_{repeater\ beacon}$ where N is an integer and $\Delta_{repeater\ beacon}$ is a beacon interval of the repeater (hereinafter repeater beacon interval). Thus, if the repeater beacon interval is 100 ms, the TBTTs of the repeater in the current repeater TBTT schedule 204 may be scheduled for 105 ms, 205 ms, 305 ms, etc. in this example. Current repeater TBTTs that follow the next current repeater TBTT shown in FIG. 2 may be referred to as subsequent current repeater TBTTs (e.g., for any current repeater TBTTs that follow the next current repeater TBTT scheduled for 105 ms).

Due at least in part to, e.g. a first amount of time 216 for the repeater to perform DBVC off channel operations being greater than a difference between the 105 ms TBTT for the next current repeater TBTT and the 110 ms TBTT for the next root AP TBTT, the relative alignment between the root AP TBTT schedule 202 and the current repeater TBTT schedule 204 results in a collision between the next root AP TBTT and the next current repeater TBTT. If the beacon intervals of the root AP and the repeater are the same (e.g., 100 ms each), there will similarly be a collision between each subsequent pair of root AP and repeater TBTTs.

Accordingly, implementations described herein may adjust the next repeater TBTT and/or one or more subsequent repeater TBTTs to avoid such TBTT collisions. For example, as illustrated in FIG. 2, the next current repeater TBTT in the current repeater TBTT schedule 204 scheduled for 105 ms may be delayed by an amount of time 220 so that it is scheduled at, e.g., 185 ms, which is illustrated as a next new repeater TBTT in the new repeater TBTT schedule 206. Thereafter, TBTTs of the repeater in the new repeater TBTT schedule 206 in this example may be scheduled at time 185 ms+N*$\Delta_{repeater\ beacon}$. Thus, if the repeater beacon interval is 100 ms, the TBTTs of the repeater in the new repeater TBTT schedule 206 may be scheduled for 185 ms, 285 ms, 385 ms, etc. in this example. New repeater TBTTs that follow the next new repeater TBTT shown in FIG. 2 may be referred to as subsequent new repeater TBTTs (e.g., for any new repeater TBTTs that follow the next new repeater TBTT scheduled for 185 ms).

Figure 3:
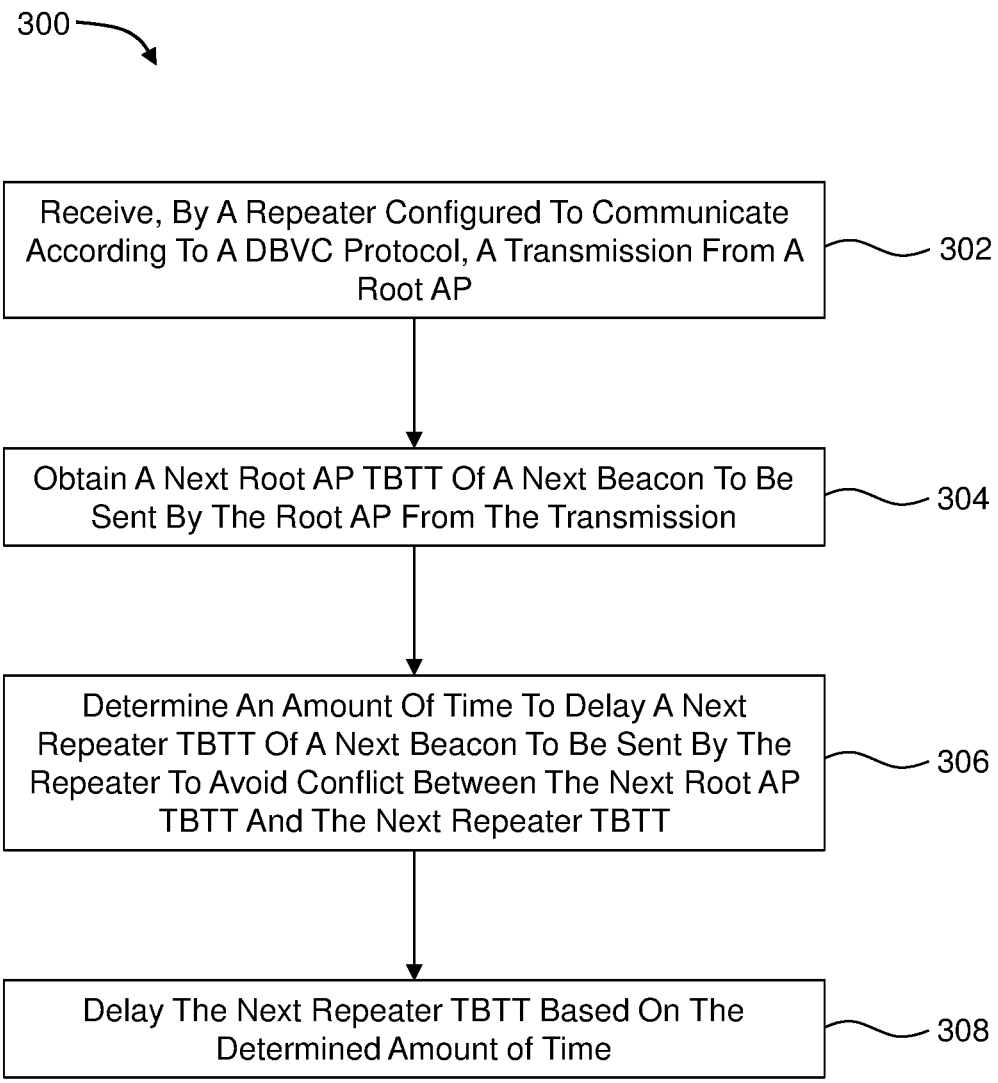
FIG. 3 illustrates a flowchart of an example method to avoid TBTT collisions.

Consistent with the foregoing, FIG. 3 illustrates a flowchart of an example method 300 to avoid TBTT collisions. The method 300 may be performed by any suitable system, apparatus, or device. For example, any of the root APs or repeaters herein may perform or direct performance of one or more of the operations associated with the method 300. The method 300 may include one or more of blocks 302, 304, 306, or 308. The method 300 may begin at block 302.

At block 302, the method 300 may include receiving, by a repeater configured to communicate according to a DBVC protocol, a transmission from a root AP. Block 302 may be followed by block 304.

At block 304, the method 300 may include obtaining a next root AP TBTT of a next beacon to be sent by the root AP from the transmission. For example, the repeater of FIG. 2 may obtain the next root AP TBTT, e.g., 110 ms, of the next beacon to be sent by the root AP from the transmission received by the repeater from the root AP. Block 304 may be followed by block 306.

At block 306, the method 300 may include determining an amount of time to delay a next repeater TBTT of a next beacon to be sent by the repeater to avoid conflict between the next root AP TBTT and the next repeater TBTT. For example, the repeater of FIG. 2 may determine the amount of time 220 to delay the next current repeater TBTT of the next beacon to be sent by the repeater to avoid conflict between the next root AP TBTT and the resulting next new repeater TBTT. Block 306 may be followed by block 308.

At block 308, the method 300 may include delaying the next repeater TBTT based on the determined amount of time. For example, the repeater of FIG. 2 may delay the next current repeater TBTT of the current repeater TBTT schedule 204 by or otherwise based on the determined amount of time 220 to the next new repeater TBTT of the new repeater TBTT schedule 206.

Although illustrated with discrete blocks, the steps and operations associated with one or more of the blocks of the method 300 may be divided into additional blocks, combined into fewer blocks, or eliminated, depending on the particular implementation. Alternatively or additionally, the method 300 may include additional blocks, steps, or operations.

For example, with combined reference to FIGS. 2 and 3, determining the amount of time to delay the next repeater TBTT at block 306 of the method 300 may include some or all the following. The repeater may determine the next repeater TBTT, e.g., according to the current repeater TBTT schedule 204. In this example, the next repeater TBTT is the next current repeater TBTT at 105 ms. The repeater may determine or otherwise obtain the repeater beacon interval. In this example, the repeater beacon interval is 100 ms. The repeater may determine the first amount of time 216 for the repeater to perform DBVC off channel operations. In the example of FIG. 2, the first amount of time 216 is 10 ms. The repeater then determines a second amount of time 218 that will cause the next repeater TBTT to avoid occurring during DBVC off channel operations of the repeater. In the example of FIG. 2, the second amount of time is 15 ms. The repeater may sum the next root AP TBTT (110 ms) with the repeater beacon interval (100 ms) to generate an intermediate sum (110 ms+100 ms=210 ms). The repeater may then subtract from the intermediate sum (210 ms) the first amount of time 216 (10 ms), the second amount of time 218 (15 ms), and the next repeater TBTT (105 ms) to generate a difference (210 ms−10 ms−15 ms−105 ms=80 ms) as the amount of time 220 to delay.

The repeater delaying the next repeater TBTT based on the determined amount of time at block 308 of the method 300 may include delaying the next repeater TBTT by the determined amount of time, e.g., by increasing the repeater beacon interval (e.g., an original repeater beacon interval) from the previous repeater TBTT to the next repeater TBTT by the determined amount of time. For example, as illustrated in FIG. 2, the next current repeater TBTT of 105 ms in the current repeater TBTT schedule 204 may be delayed by the determined amount of time 220 (e.g., 80 ms) to the next new repeater TBTT of 185 ms in the new repeater TBTT schedule 206. After the next new repeater TBTT, the repeater may then change the repeater beacon interval back to the original repeater beacon interval. Alternatively, the repeater delaying the next repeater TBTT based on the determined amount of time may include delaying the next repeater TBTT by a portion of the determined amount of time; the repeater may then delay one or more subsequent repeater TBTTs by one or more other portions of the determined amount of time where all of the portions of the determined amount of time in sum are equal to the determined amount of time.

Alternatively or additionally, the method 300 or other implementations described herein may include setting the repeater beacon interval to a different value than the root AP beacon interval. In such implementations, at least some repeater TBTTs may be out of phase with root AP TBTTs to avoid TBTT collisions at least some, but not necessarily all, of the time. For example, suppose the repeater beacon interval is 130 ms and the first repeater TBTT is at 5 ms such that the first five repeater TBTTs are at 5 ms, 135 ms, 265 ms, 395 ms, and 525 ms. Further suppose that the root AP beacon interval is 100 ms and the first root AP TBTT is at 50 ms such that the first six root AP beacon intervals are at 50 ms, 150 ms, 250 ms, 350 ms, 450 ms, and 550 ms. In this example, at least the repeater TBTTs at 5 ms, 395 ms, and 525 ms may be sufficiently out of phase with the closest corresponding root AP TBTTs to avoid collisions.

Alternatively or additionally, the method 300 may include setting the repeater beacon interval equal to the root AP beacon interval if not already equal, or confirming that the repeater beacon interval is equal to the root AP beacon interval. When the next repeater AP TBTT is delayed relative to the next root AP TBTT by the determined amount of time, the repeater beacon interval being equal to the root AP beacon interval may ensure that all subsequent repeater TBTTs are out of phase with all subsequent root AP TBTTs, thereby avoiding collisions.

Figure 4A:
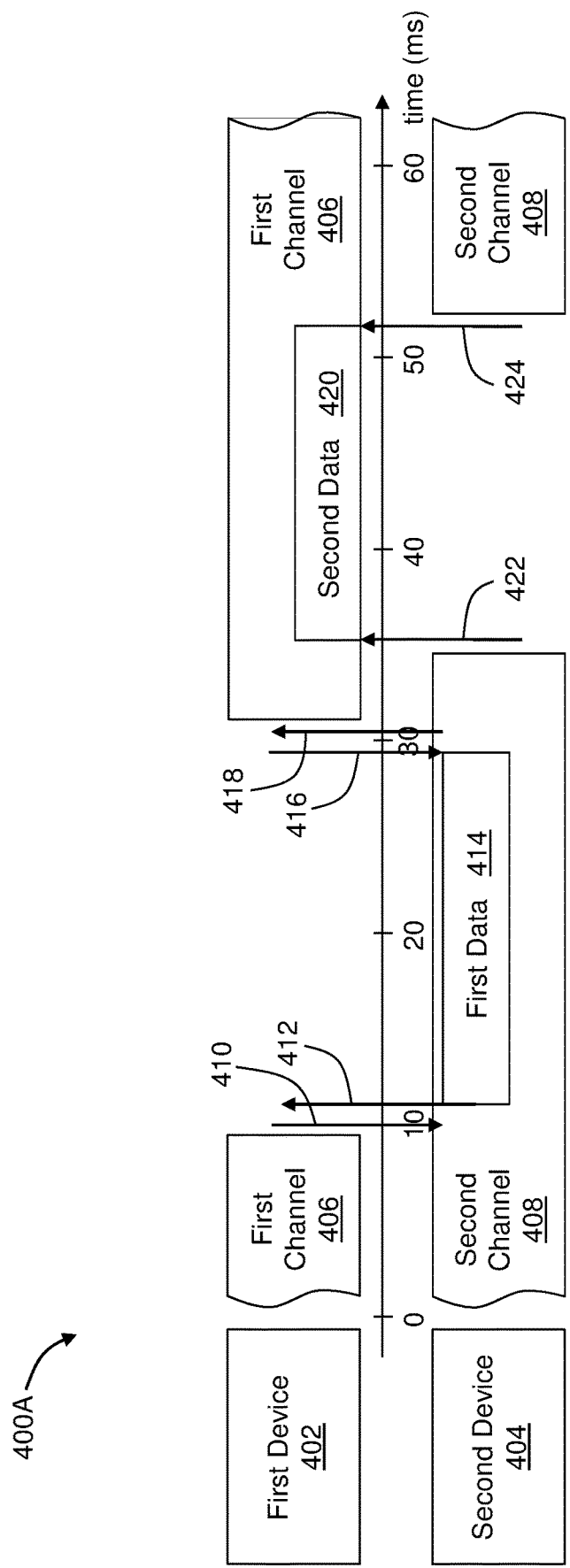
FIG. 4A illustrates an example sequence to optimize transmissions through a trigger-based mechanism when both a repeater and a root AP are configured to optimize through the trigger-based mechanism.

Some implementations herein may alternatively or additionally optimize transmissions through a trigger-based mechanism. FIG. 4A illustrates an example sequence 400A to optimize transmissions through a trigger-based mechanism when both a repeater and a root AP are configured to optimize through the trigger-based mechanism. FIG. 4A specifically illustrates a first wireless communication device 402 (hereinafter "first device 402") and a second wireless communication device 404 (hereinafter "second device 404"), one or both of which may be configured to communicate according to a DBVC protocol. In an example, the first device 402 includes a root AP and the second device 404 includes a repeater. In another example, the first device 402 includes a repeater and the second device 404 includes a root AP.

The first device 402 may be configured to simultaneously or selectively communicate over a first channel 406 and a second channel 408. Similarly, the second device 404 may be configured to simultaneously or selectively communicate over the first channel 406 and the second channel 408. For example, where the second device 404 is a repeater that implements the DBVC protocol, the second device 404 may be configured to selectively communicate over the first channel 406 or the second channel 408 where the first channel 406 is its off channel (or on channel) and the second channel 408 is its on channel (or off channel).

In general, and according to the DBVC protocol, one or both of the first or second devices 402, 404 may be configured to alternately communicate over the first and second channels 406, 408 for a predetermined interval on each channel 406, 408 before switching to the other. The predetermined interval may be the same for each channel 406, 408 or different from one channel 406, 408 to the other. Alternatively or additionally, the predetermined interval may be adjusted from one switching cycle to the next but may generally be fixed in duration when the interval begins.

In view of the foregoing, when the first or second device 402, 404 is on a given one of the channels 406, 408, it may generally be unable to communicate on the other one of the channels 406, 408 until it completes a current interval and switches to the other channel. Now suppose the first and second devices 402, 404 are on different channels 406, 408 but the first device 402 (or the second device 404) determines (e.g., by examining its buffers) that data is building up at the first device 402 for the second device 404 (or the first device 402). Some existing systems require that the first device 402 wait until the second device 404 complete its interval on its current channel (e.g., the second channel 408) and switch to the same channel as the first device 402 (e.g., the first channel 406) before the first device 402 can transmit the data building up there to the second device 408. Implementations described herein, however, implement the trigger-based mechanism to allow the first device 402 to transmit the data to the second device 404 without waiting for the second device 404 to complete its interval and switch to the same channel as the first device 402.

In the example illustrated in FIG. 4A, for instance, the first device 402 is communicating over the first channel 406 while the second device 404 is communicating over the second channel 408. If the first device 402 decides to communicate with the second device 404 without waiting for the second device 404 to complete its current interval and switch to the first channel 406, the first device 402 may switch to the second channel 408 and provide a trigger frame 410 over the second channel 408 to the second device 404. The second device 404 may receive the trigger frame 410 and send in response thereto an ACK frame 412 to the first device 402 over the second channel 408. The ACK frame 412 may confirm receipt of the trigger frame 410 at the second device 404 to the first device 402 and signal a readiness to communicate with the first device 402 over the second channel 408. The first device 402 may receive the ACK frame 412 from the second device 404. After or in response to receiving the ACK frame, the first device 402 may transmit first data 414 to the second device 404 over the second channel 408. After transmission of the first data 414, the first device 402 may transmit an end frame 416 over the second channel 408 to the second device 404. The second device 404 may receive the end frame 416 and send in response thereto an ACK frame 418 to the first device 402 over the second channel 408. The ACK frame 418 may confirm receipt of the end frame 416 at the second device 404 to the first device 402. After or in response to transmitting the end frame 416 or receiving the ACK frame 418, the first device 402 may switch back to the first channel 406.

In some implementations, the first device 402 may avoid a TBTT of the first device 402 when sending the trigger frame 410 and/or when sending the first data 414. For example, the first device 402 may determine its next TBTT and only send the trigger frame 410 if there is sufficient time to send the trigger frame 410, and optionally send the first data 414, before the next TBTT of the first device 402. Alternatively or additionally, a dwell time, e.g., a duration or interval, that the first device 402 stays on the second channel 408 may be determined based on a size of the first data 414 intended for the second device 404 in the buffer of the first device 402 and/or whether other clients are connected and if there is traffic.

As further illustrated in FIG. 4A, the second device 404 may send second data 420 to the first device 406. In this example, the second device 404 may switch from the second channel 408 to the first channel 406 and send a trigger frame 422 over the first channel 402 to the first device 402. The second device 404 may send an end frame 424 over the first channel 402 to the first device 402 when it has completed transmission of the second data 420. In this and other implementations, the second device 404 may start transfer of the second data 420 as a normal power save client by sending QOS DATA null frames with a power management bit changed. The second device 404 may then switch back to the second channel 408 following transmission of the end frame 424 and/or following completion of a dwell time or interval of the second device 404 for the first channel 406.

Figure 4B:
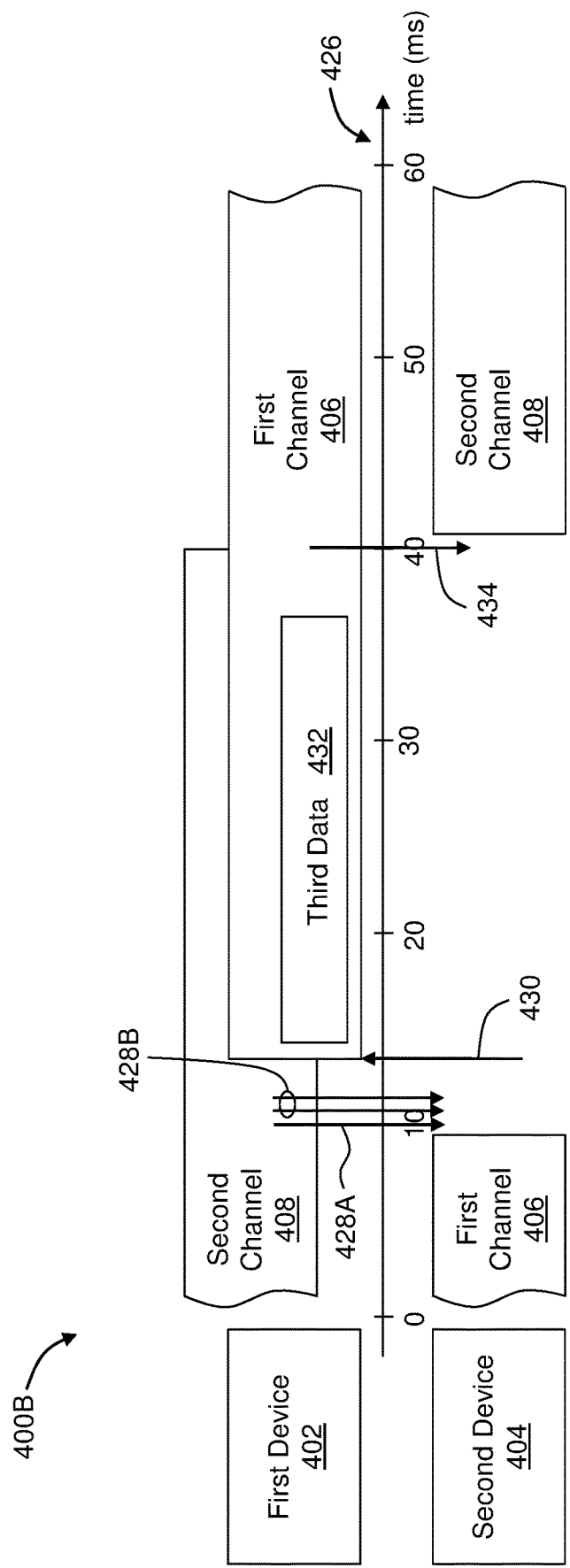
FIG. 4B illustrates another example sequence to optimize transmissions through a trigger-based mechanism when both a repeater and a root AP are configured to optimize through the trigger-based mechanism.

FIG. 4B illustrates another example sequence 400B to optimize transmissions through a trigger-based mechanism when both a repeater and a root AP are configured to optimize through the trigger-based mechanism. FIG. 4B specifically illustrates the first device 402 and the second device 404.

The possibility exists that the first device 402 and the second device 404 may switch to opposite channels at the same time or about the same time, e.g., when attempting to communicate with each other. Accordingly, some implementations described herein may relatively quickly switch the first device 402 (or the second device 404) back to the other channel, e.g., in response to a certain number of trigger frames (such as 10 trigger frames) being sent to the second device 404 (or the first device 402) without receiving any ACK frames. By switching back relatively quickly, the first device 402 may "meet" the second device 404 in the channel it last switched to despite the first device 402 having been recently switched to the opposite channel.

For example, at about a time of 0 ms along an example timeline 426 in FIG. 4B, the first device 402 may switch to or already be at the second channel 408, while the second device 404 may switch to or already be at the first channel 406. At about at time of 10 ms along the timeline 426, the first device 402 may send a trigger frame 428A over the second channel 408 to the second device 404. If the first device 402 does not receive an ACK frame from the second device 404, the first device 402 may send the second device 404 one or more additional trigger frames 428B over the second channel 408 where each of the one or more additional trigger frames 428B may be sent in response to not receiving an ACK frame for the previous trigger frame 428A or 428B. The trigger frames 428A, 428B are collectively referred to herein as "trigger frames 428". In response to sending a certain number of trigger frames 428, such as ten trigger frames 428, to the second device 404 over the second channel 408 without receiving any ACK frames, the first device 402 may switch to the first channel 406, e.g., at about a time of 13 ms along the timeline 426 as designated at 430 in FIG. 4B.

The first device 402 and the second device 404 may then communicate with each other over the first channel 406, e.g., by exchanging third data 432 over the first channel 406. When the first device 402 is a root AP and the second device 404 is a repeater, data exchange of the third data 432 may be initiated by the second device 404 by sending data frames with a power management bit=0. Alternatively, it may be initiated by the first device 402 sending one or more trigger frames to the second device 404 and receiving an ACK frame from the second device 404.

At about a time of 40 ms along the timeline 426, the second device 404 may switch back to the second channel 408 as designated at 434. For example, the second device 404 may have completed its off channel dwell time (e.g., its dwell time on the first channel 406) at which time it switches to its on channel, e.g., to the second channel 408.

Some implementations may implement a backoff or priority for off-channel trigger frames. In an implementation, the device with a basic service set (BSS) with a lower MAC address may switch back to a previous channel more aggressively than the other device to reduce the chance of a double switch back. In the example of FIG. 4B, for instance, the first and second devices 402 may obtain each other's MAC address and the first or second device 402, 404 with the lower MAC address may be more aggressive about switching back to a previous channel than the other device. For example, if the first device 402 has the lower MAC address and it sends the trigger frames 428 to the second device 404 over the second channel 408 without receiving any ACK frames from the second device 404, the first device 402 may switch back to the first channel 406 after X seconds. In comparison, if the second device 404 has the higher MAC address and it sends trigger frames to the first device 402 over the first channel 406 without receiving any ACK frames from the first device 402, the second device 404 may switch back to the second channel 408 after Y seconds where Y is greater or even much greater than X.

Alternatively or additionally, a random backoff scheme may be implemented to minimize or at least reduce a probability of a double switch where the first and second devices 402, 404 miss each other. In this example, an amount of time each device 402, 404 waits after sending a trigger frame (or multiple trigger frames) to the other device without receiving any ACK frames from the other device before switching back to a previous channel may be random to reduce a likelihood that both devices will switch channels at the same time and miss each other again.

Figure 5:
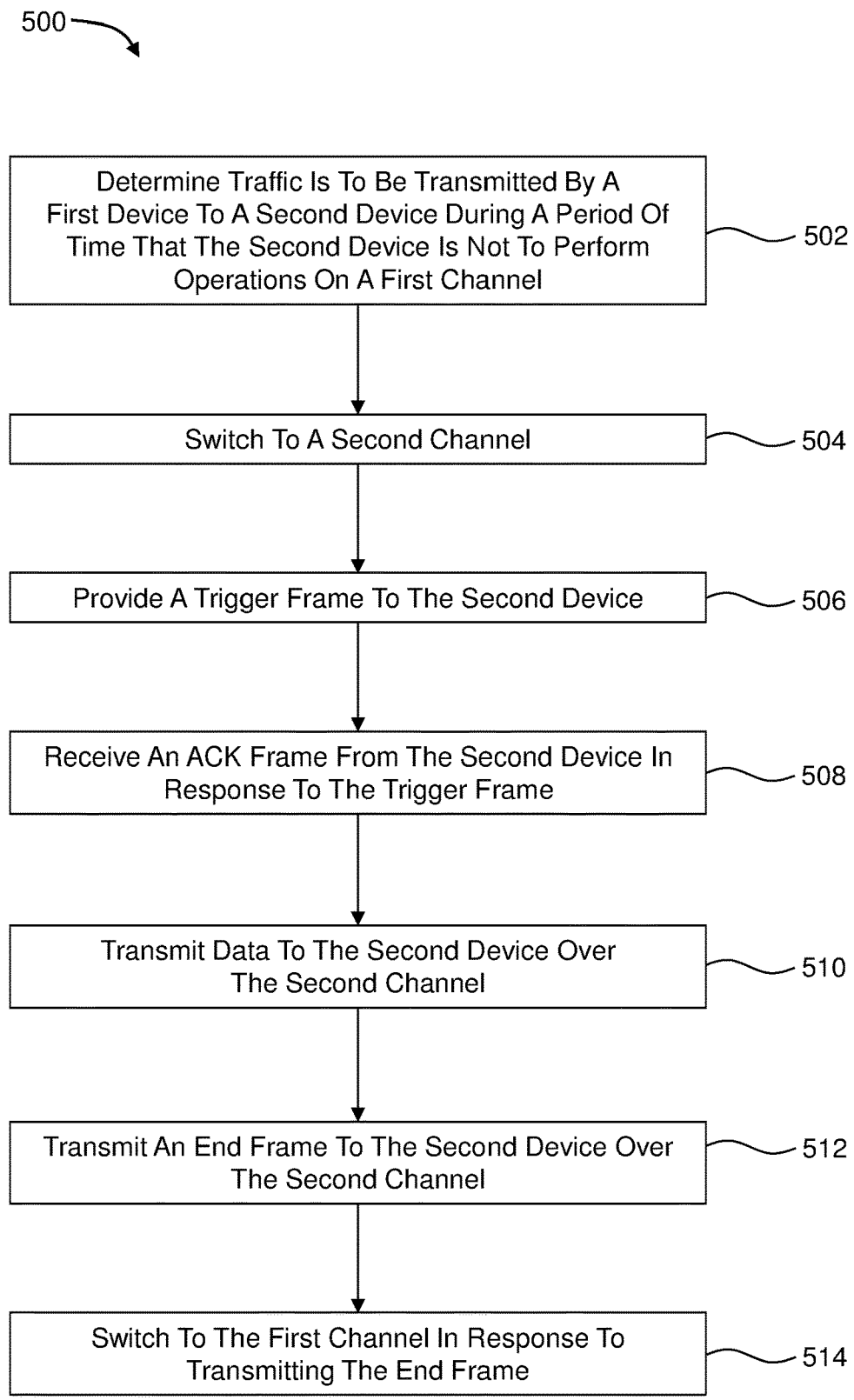
FIG. 5 illustrates a flowchart of an example method to optimize transmissions through a trigger-based mechanism.

Consistent with the foregoing, FIG. 5 illustrates a flowchart of an example method 500 to optimize transmissions through a trigger-based mechanism. The method 300 may be performed by any suitable system, apparatus, or device. For example, any of the root APs or repeaters herein may perform or direct performance of one or more of the operations associated with the method 500. The method 500 may include one or more of blocks 502, 504, 506, 508, 510, 512, or 514. The method 500 may begin at block 502.

At block 502, the method 500 may include determining that traffic is to be transmitted by a first wireless communication device (hereinafter "first device") to a second wireless communication device (hereinafter "second device") configured to communicate according to a DBVC protocol during a period of time that the second device is not to perform operations on a first channel. For example, the first device 402 of FIG. 2 may determine that traffic is to be transmitted by the first device 402 to the second device 404 during a period of time that the second device 404 is not to perform operations on the first channel 406. Block 502 may be followed by block 504.

At block 504, the method 500 may include switching to a second channel. For example, the first device 402 may switch from the first channel 406 to the second channel 408. Block 504 may be followed by block 506.

At block 506, the method 500 may include providing a trigger frame to the second device over the second channel. For example, the first device 402 may send the trigger frame 410 to the second device 404 over the second channel 408. Block 506 may be followed by block 508.

At block 508, the method 500 may include receiving an ACK frame from the second device over the second channel, the ACK frame being sent by the second device to the first device in response to the second device receiving the trigger frame. For example, the first device 402 may receive the ACK frame 412 over the second channel 408 where the second device 404 sends the ACK frame 412 in response to the second device 404 receiving the trigger frame 410. Block 508 may be followed by block 510.

At block 510, the method 500 may include transmitting data to the second device over the second channel. For example, the first device 402 may transmit the first data 414 to the second device 404 over the second channel 408. Block 510 may be followed by block 512.

At block 512, the method 500 may include transmitting an end frame to the second device over the second channel. For example, the first device 402 may transmit the end frame 416 to the second device 404 over the second channel 408. Block 512 may be followed by block 514.

At block 514, the method 500 may include switching to the first channel in response to transmitting the end frame. For example, the first device 402 may switch from the second channel 408 back to the first channel 406 in response to transmitting the end frame 416. Alternatively or additionally, the first device 402 may switch back to the first channel 406 in response to receiving the ACK frame 418 from the second device 404, the ACK frame 418 being sent by the second device 404 in response to the second device 404 receiving the end frame 416.

Although illustrated with discrete blocks, the steps and operations associated with one or more of the blocks of the method 500 may be divided into additional blocks, combined into fewer blocks, or eliminated, depending on the particular implementation. Alternatively or additionally, the method 500 may include additional blocks, steps, or operations.

For example, the method 500 may further include the first device receiving a second trigger frame from the second device over the first channel, e.g., according to the DBVC protocol and/or during a period of time that the first device is not to perform operations on the second channel; the first device receiving data from the second device over the first channel; and the first device receiving a second end frame from the second device, where the second end frame indicates that the second device is to switch to the second channel. As an example, and referring to FIG. 4A, the first device 402 may receive the trigger frame 422 from the second device 404 over the first channel 406. The first device 402 may receive the second data 420 from, or more generally exchange the second data 420 with, the second device 404 over the first channel 406. The first device 402 may receive the end frame 424 from the second device 404 where the end frame 424 may indicate that the second device 404 is switching back to the second channel 408.

Alternatively or additionally, the method 500 may include receiving a second ACK frame from the second device in response to the end frame. For example, the first device 402 may receive the ACK frame 418 from the second STA 404, the ACK frame 418 being sent by the second device 404 to the first device 402 in response to the second device 404 receiving end frame 416 from the first device 402.

In some implementations, the method 500 may include providing one or more other trigger frames to the second device over the second channel prior to providing the trigger frame; and determining that an ACK frame has not been received from the second device for the one or more other trigger frames, where the first device provides the trigger frame to the second device in response determining that an ACK frame has not been received from the second device for the one or more other trigger frames. For example, suppose in FIG. 4A that the first device 402 sends one or more other trigger frames to the second device 404 over the second channel 408 prior to sending the trigger frame 410 and without receiving any ACK frames from the second device 404. The first device 402 may continue sending trigger frames to the second device 404 until the first device 402 receives the ACK frame 412 from the second device 404, or until some other event occurs (e.g., the first device 402 sends a certain number of trigger frames without receiving any ACK frames).

Alternatively or additionally, the method 500 may include switching to the second channel; providing multiple trigger frames to the second device over the second channel; determining that an ACK frame has not been received from the second device for any of the plurality of trigger frames; switching back to the first channel; and communicating with the second device over the first channel. For example, and referring to FIG. 4B, the first device 402 may switch to the second channel 408 and send multiple trigger frames 428 to the second device 404 over the second channel 408. However, if the second device 404 has switched to the first channel 406, it will not receive any of the trigger frames 428 and thus will not send any ACK frames. The first device 402 may continue sending trigger frames 428 indefinitely, or may stop sending trigger frames after sending up to a certain number of trigger frames, such as 10 trigger frames, without receiving any ACK frames from the second device 404. As a result, the first device 402 may switch back to the first channel 406. The first device 402 may then communicate with the second device 404 over the first channel 406, e.g., by exchanging the third data 432 with the second device 404 over the first channel 406.

In some implementations of the method 500, the first device may include a root AP and the second device may include a repeater configured to communicate with the root AP within an upstream network (e.g., over an uplink or off channel) and with one or more client devices within a downstream network (e.g., over a downlink or on channel) according to the DBVC protocol.

Some example implementations herein may alternatively or additionally optimize traffic flows based on buffers queued within hardware of a repeater, such as the repeater 104 of FIG. 1. Optimization of traffic flows based on buffers queued within hardware will be described in the context of FIG. 1 for convenience with the understanding that such implementations may be implemented in other operational environments and/or devices.

In this and other examples, the repeater 104 may have both an upstream buffer and a downstream buffer. The upstream buffer may buffer upstream traffic intended for the root AP 102 or more generally one or more root APs. The downstream buffer may buffer downstream traffic intended for one or more of the first client device 106 or the second client device 108 or more generally one or more client devices. The repeater 104 may determine a load on the upstream buffer that may be indicative of data to be transmitted within an upstream network, e.g., on the off channel over the uplink 110 to the root AP 102. The repeater 104 may also determine a load on the downstream buffer that may be indicative of data to be transmitted within a downstream network, e.g., on the on channel over the downlink 112 to one or more client devices (e.g., clients devices 106, 108). The repeater 104 may then determine an amount to adjust DBVC duty cycles of the repeater 104 based on the loads on the upstream and downstream buffers and may adjust the DBVC duty cycles accordingly.

The DBVC duty cycles may include a duty cycle of the on channel (hereinafter "on channel duty cycle") and a duty cycle of the off channel (hereinafter "off channel duty cycle"). The on channel duty cycle may include a ratio of time spent on the on channel to total time spent on both the on channel and the off channel. Similarly, the off channel duty cycle may include a ratio of time spent on the off channel to total time spent on both the on channel and the off channel.

Using dynamic, e.g., adjustable, DBVC duty cycles may optimize for varying traffic rates of the repeater 104 or the root AP 102. Traffic/data may be buffered per node or per access category (AC), which may permit a total buffer queue length of the repeater 104 to be determined for both the upstream and downstream buffers. Different factors for the ACs may be called "f(tid)" and may include f(VI)=4; f(VO)=3; f(BE)=2; f(BK)=1 where VI refers to video traffic/data, VO refers to voice traffic/data, BE refers to best effort traffic/data, and BK refers to background traffic/data. Each of the f(tid) factors may be or be associated with a priority of the corresponding AC, e.g., where the f(tid) factor of the VI AC is greater and thus designates a higher priority than the f(tid) factor of the VO AC, and so on, e.g., f(VI)=4>f(VO)=3>f(BE)=2>f(BK)=1. The foregoing provides one example of ACs, f(tid) factors, and associated priorities. Other examples may include other ACs, other f(tid) factors, and/or other associated priorities.

If a buffer queue is not full, the client-specific transmit buffer size of the repeater 104 may be determined according to:

$$\text{Client\_tx\_buf\_pkts} = f(\text{tid}) * \text{tid\_pkts\_number} \quad \text{(Equation 1)}$$

In equation 1, Client_tx_buf_pkts may represent a client-specific repeater buffer size at the repeater 104. For purposes of equation 1, the root AP 102 may be considered as a client of the repeater 104. In equation 1, f(tid) is defined above and tid_pkts_number is a number of packets for a given AC queued in a buffer at the repeater 104 for the corresponding "client" (e.g., the root AP 102, the first client device 106, or the second client device 108). A total downstream buffer size of the repeater 104 may be a sum of all the client-specific buffer sizes of the clients the repeater 104 communicates with on the on channel (e.g., the first and second client devices 106). A total upstream buffer size of the repeater 104 may be the client-specific buffer size for the root AP 102.

If the buffer queue is full, a counter client_tx_buf_full may be increased.

In some implementations, the buffer queue size may be determined each time the repeater 104 is going to send packets. Alternatively or additionally, the duty cycles may be adjusted every 5 seconds or according to some other schedule, pattern, or arrangement based on the buffer queue size. In these and other implementations, the duty cycles may be determined and adjusted based on the following algorithms or other suitable algorithms.

First, if the buffer queue is not full and the sizes of the downstream buffer and the upstream buffer are about the same, the DBVC duty cycles may not be adjusted. Otherwise, the DBVC duty cycles may be adjusted. Determination of whether the sizes of the downstream buffer and the upstream buffer are about the same may be based on or performed according to any suitable algorithm. For example, if dividing the size of the upstream buffer by the size of the downstream buffer results in a value between 0.5 to 2, the sizes of the downstream and upstream buffers may be considered to be about the same and no adjustments may be made to the DBVC duty cycles.

Second, if the buffer queue is full and the sizes of the downstream buffer and the upstream buffer are about the same, the DBVC duty cycles may not be adjusted. Otherwise, the DBVC duty cycles may be adjusted. As above, determination of whether the sizes of the downstream buffer and the upstream buffer are about the same may be based on or performed according to any suitable algorithm. For example, if dividing the size of the upstream buffer by the size of the downstream buffer results in a value between 0.5 to 2, the sizes of the downstream and upstream buffers may be considered to be about the same and no adjustments may be made to the DBVC duty cycles.

In some implementations, the DBVC duty cycles of the repeater 104 may be changed by adjusting the off channel dwell time or frequency of switching the off channel. Alternatively or additionally, when it is determined to adjust the DBVC duty cycles, the DBVC duty cycles may be adjusted to or based on one of the following four levels of duty cycles:

Level 1: channel switch may occur once per two TBTTs and the off channel dwell time may be equal to 32 ms (Max NAV).

Level 2: channel switch may occur once per TBTT and the off channel dwell time may be equal to 32 ms (Max NAV).

Level 3: channel switch may occur twice per TBTT and the off channel dwell time may be equal to 32 ms (Max NAV).

Level 4: channel switch may occur three times per TBTT and the off channel dwell time may be equal to 17 ms.

Stated another way, for Level 1, channel switching may occur once for every two TBTTs, or once for every two beacon intervals. Similarly, for Level 2, channel switching may occur once for every TBTT, or once for every beacon interval. Similarly, for Level 3, channel switching may occur twice for every TBTT, or twice for every beacon interval. Similarly, for Level 4, channel switching may occur three times for every TBTT, or three times for every beacon interval. Level 4 may significantly reduce round trip time (RTT) for communications compared to Levels 1-3.

Each of Levels 1-4 has a particular off channel duty cycle and on channel duty cycle. In general, each successive one of Levels 1-3 increases the off channel duty cycle and decreases the on channel duty cycle, while Level 4 reduces RTT. The DBVC duty cycles of the repeater 104 may be adjusted in a desired direction by moving in an appropriate direction from one level to another. Thus, if the downstream buffer is substantially greater than the upstream buffer (e.g., if the size of the upstream buffer divided by the size of the downstream buffer is less than 0.5), an increase in the on channel duty cycle may help clear the downstream buffer so the DBVC duty cycles of the repeater 104 may be adjusted by moving down a level, e.g., from Level 3 to Level 2, from Level 3 to Level 1, or from Level 2 to Level 1. On the other hand, if the downstream buffer is substantially less than the upstream buffer (e.g., if the size of the upstream buffer divided by the size of the downstream buffer is greater than 2), an increase in the off channel duty cycle may help clear the upstream buffer so the DBVC duty cycles of the repeater 104 may be adjusted by moving up a level, e.g., from Level 1 to Level 2, from Level 1 to Level 3, or from Level 2 to Level 3.

Figure 6:
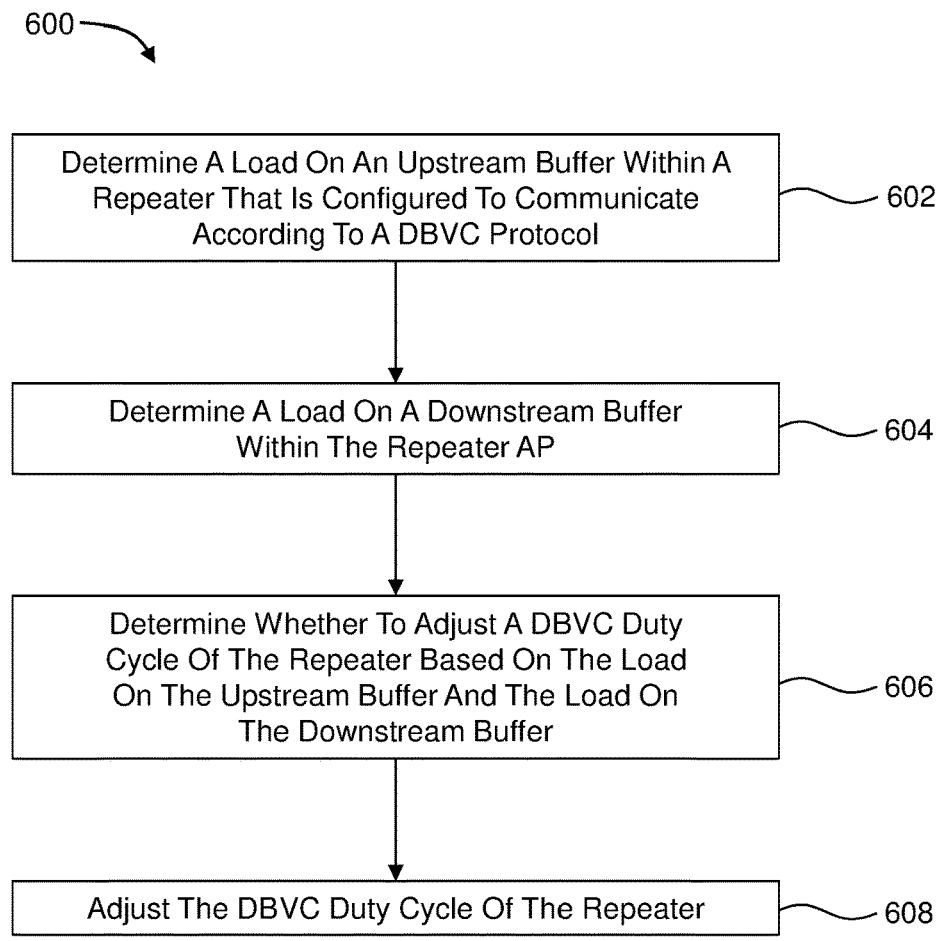
FIG. 6 illustrates a flowchart of an example method to optimize traffic flows based on buffers queued within hardware of a repeater or other STA that is configured to communicate according to a DBVC protocol.

Consistent with the foregoing, FIG. 6 illustrates a flowchart of an example method 600 to optimize traffic flows based on buffers queued within hardware of a repeater or other STA that is configured to communicate according to a DBVC protocol. The method 600 may be performed by any suitable system, apparatus, or device. For example, any of the root APs or repeaters herein may perform or direct performance of one or more of the operations associated with the method 600. The method 600 may include one or more of blocks 602, 604, 606, or 608. The method 600 may begin at block 602.

At block 602, the method 600 may include determining a load on an upstream buffer within a repeater that is configured to communicate according to a DBVC protocol. The load on the upstream buffer may include or correspond to data to be transmitted within an upstream network, e.g., to a root AP. The load on the upstream buffer may include a size of the upstream buffer. In some implementations, block 602 may include the repeater 104 of FIG. 1 determining a load on its upstream buffer, e.g., a load of data intended for the root AP 102. The repeater 104 may determine the load on its upstream buffer for the root AP 102 according to equation 1 above or in any other suitable manner. The determination of the load on the upstream buffer may include identifying a priority of the data (e.g., f(VI), f(VO), f(BE), f(BK)) within the upstream buffer and calculating the load on the upstream buffer based on the identified priority of the data within the upstream buffer (e.g., according to equation 1) where a given amount of data with higher priority contributes more to the determined load than a same amount of data with lower priority. Accordingly, the priority of the data within the upstream buffer may be determined based on ACs associated with the data within the upstream buffer. Block 602 may be followed by block 604.

At block 604, the method 600 may include determining a load on a downstream buffer within the repeater. The load on the downstream buffer may include or correspond to data to be transmitted within a downstream network, e.g., to one or more client devices of the repeater. For example, the repeater 104 of FIG. 1 may determine a load on its downstream buffer, e.g., a load of data intended for the first or second client devices 106, 108 or other client devices serviced by the repeater 104 during its on channel. The repeater 104 may determine the load on its downstream buffer for client devices it services on its on channel (e.g., first and second client devices 106, 108) according to equation 1 above and summing all the corresponding client-specific buffer sizes or in any other suitable manner. The determination of the load on the downstream buffer may include identifying a priority of the data (e.g., f(VI), f(VO), f(BE), f(BK)) within the downstream buffer and calculating the load on the downstream buffer based on the identified priority of the data within the downstream buffer (e.g., according to equation 1) where a given amount of data with higher priority contributes more to the determined load than a same amount of data with lower priority. Accordingly, the priority of the data within the downstream buffer may be determined based on ACs associated with the data within the downstream buffer. Block 604 may be followed by block 606.

At block 606, the method 600 may include determining whether to adjust DBVC duty cycles of the repeater based on the load on the upstream buffer and the load on the downstream buffer. For example, the repeater 104 may compare the loads on the upstream and downstream buffers and not make any adjustments if the loads are about the same or the repeater 104 may determine to move up or down among Levels 1-4 to adjust DBVC duty cycles as described above depending on whether the upstream or downstream buffer is larger than the other. Levels 1-4 described above are provided as examples only and other implementations may have other levels and/or different corresponding DBVC duty cycles than those of Levels 1-4.

In this and other implementations, determining whether to adjust DBVC duty cycles of the repeater based on the load on the upstream and downstream buffers at block 606 may include determining a ratio of the load on the upstream buffer to the load on the downstream buffer, e.g., dividing the load on the upstream buffer by the load on the downstream buffer. If the ratio is within a predetermined range at which the loads on the upstream and downstream buffers are considered to be about the same, it may be determined not to adjust DBVC duty cycles of the repeater. The predetermined range may be 0.5 to 2 in this example, or some other range. If the ratio is outside the predetermined range, it may be determined to adjust DBVC duty cycles of the repeater.

Alternatively or additionally, block 606 may include determining an amount to adjust DBVC duty cycles of the repeater. The determination of the amount may depend on a disparity between the loads on the upstream and downstream buffers. For example, if the ratio of the load or size of the upstream buffer to the load or size of the downstream buffer is just outside the range in which the loads are considered to be about the same (e.g., 0.5 to 2 in this example), the repeater 104 may determine to adjust the DBVC duty cycles by a single level, e.g., by moving up or down a single level. On the other hand, if the ratio of the load or size of the upstream buffer to the load or size of the downstream buffer is substantially outside the range in which the loads are considered to be about the same, such as less than 0.25 or greater than 4 (indicating that the load on the upstream or downstream buffer is four times or more greater than the other), the repeater 104 may determine to adjust the DBVC duty cycles by two or more levels, e.g., by moving up or down two or more levels. Block 606 may be followed by block 608.

At block 608, the method 600 may include adjusting the DBVC duty cycles of the repeater. For example, the repeater 104 may adjust its DBVC duty cycles by moving up or down among Levels 1-4 as described above and as determined at block 606. Alternatively or additionally, the repeater 104 may adjust its DBVC duty cycles by adjusting at least one of: a number of times per TBTT the repeater 104 is to switch between communication within the downstream network (e.g., the on channel) and the upstream network (e.g., the off channel), or a duration of the off channel dwell time.

Although illustrated with discrete blocks, the steps and operations associated with one or more of the blocks of the method 600 may be divided into additional blocks, combined into fewer blocks, or eliminated, depending on the particular implementation. Alternatively or additionally, the method 600 may include additional blocks, steps, or operations.

Some example implementations herein may alternatively or additionally optimize TCP throughput through DPI and prioritization of TCP ACK packets at a repeater, such as the repeater 104 of FIG. 1, or other STA. Optimization of TCP throughput will be described in the context of FIG. 1 for convenience with the understanding that such implementations may be implemented in other operational environments and/or devices.

In these and other implementations, an initial TCP handshake may be observed, e.g., by the repeater 104, and a TCP window size or scaling factor may be determined based on the TCP handshake. Further, the repeater 104 may adjust one or both of the on channel dwell time and the off channel dwell time (generally hereinafter "on/off channel dwell time") based on one or both of the TCP window size and the application being used (e.g., based on the TCP window itself). Alternatively or additionally, the repeater 104 may adjust the on/off channel dwell time based on other parameters, such as average with standard deviation across multiple TCP window sizes as observed in different TCP streams.

For example, for bulk file uploads, the TCP window may be large. Due to the large TCP window size, the link may have greater tolerance to larger latencies. As such, longer on/off channel dwell times may be determined and used to provide optimal throughput. As another example, for web browsing, the TCP window may be small, e.g., less than or equal to 64K, and low tolerance to latencies may therefore exist. As such, shorter on/off channel dwell times may be determined and used to improve reactivity of and reduce latency of the TCP stream.

In some implementations TCP ACK packets may be important to transmit reliably and quickly, as the TCP ACK packets may impact a total RTT and throughput of the TCP stream. In these and other implementations, TCP ACK packets may be reduced, e.g., by coalescing multiple TCP ACK packets to reduce overhead during transmission. For example, eight TCP ACK packets may be compressed to a single TCP ACK packet. In some implementations, TCP ACK packets may be buffered, e.g., at the repeater 104, during an ongoing on or off channel and may then be coalesced and the coalesced TCP ACK packet may be transmitted as a last transmission prior to switching the channel. In this manner, coalescing TCP ACK packets may provide feedback to the entity awaiting the TCP ACK packets, e.g., any of the root AP 102, the repeater 104, the first client device 106, or the second client device 108, regarding a corresponding TCP stream without waiting for a subsequent duty cycle to receive the TCP ACK packets. In an example, TCP ACK packets may be buffered during a current channel; if a short time is left on the current channel (e.g., 2 milliseconds or less) and TCP ACK packets are buffered, TCP data packets may be stopped and the TCK ACK packets may be transmitted in the remaining time on the current channel prior to switching the channel. In these and other implementations, packet length may be measured to identify the TCP ACK packets.

Figure 7:
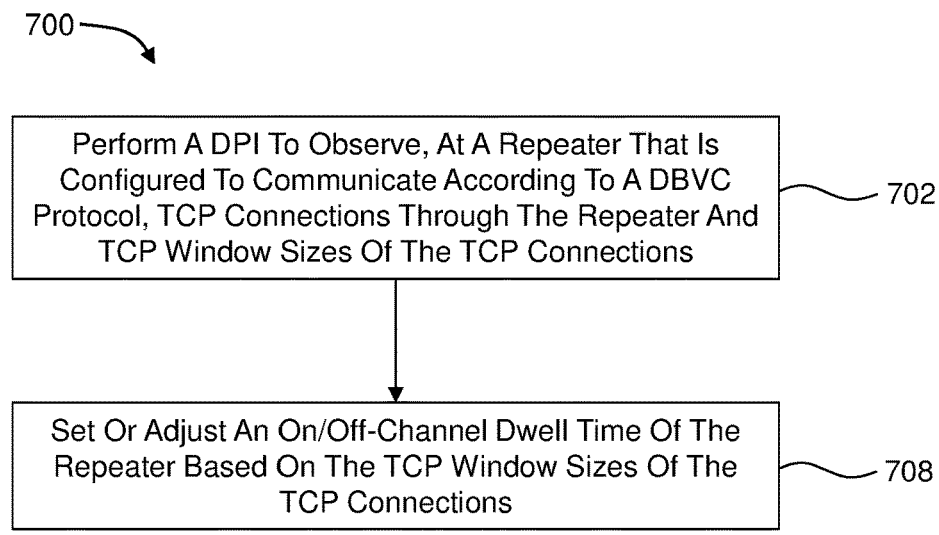
FIG. 7 illustrates a flowchart of an example method to optimize TCP throughput through DPI and prioritization of TCP ACK packets.

Consistent with the foregoing, FIG. 7 illustrates a flowchart of an example method 700 to optimize TCP throughput through DPI and prioritization of TCP ACK packets. The method 700 may be performed by any suitable system, apparatus, or device. For example, any of the root APs or repeaters or other STAs configured to communicate according to a DBVC protocol herein may perform or direct performance of one or more of the operations associated with the method 700. The method 700 may include one or more of blocks 702 or 704. The method 700 may begin at block 702.

At block 702, the method 700 may include performing a DPI to observe, e.g., at a repeater that is configured to communicate according to a DBVC protocol, TCP connections and TCP window sizes of the TCP connections. For example, the repeater 104 of FIG. 1 may perform DPI to observe TCP connections through the repeater and TCP window sizes of the TCP connections. Block 702 may be followed by block 704.

At block 704, the method may include setting or adjusting an on/off channel dwell time based on the TCP window sizes of the TCP connections. For example, the repeater 104 of FIG. 1 may set or adjust its on/off channel dwell time based on the TCP window sizes of the TCP connections. In some implementations, the on/off channel dwell time may be set or adjusted relatively high when the TCP window sizes are relatively larger. Alternatively or additionally, the on/off channel dwell time may be set or adjusted relatively low when the TCP window sizes are relatively small.

Although illustrated with discrete blocks, the steps and operations associated with one or more of the blocks of the method 700 may be divided into additional blocks, combined into fewer blocks, or eliminated, depending on the particular implementation. Alternatively or additionally, the method 700 may include additional blocks, steps, or operations.

For example, the method 700 may include determining an average TCP window size of the TCP window sizes of the TCP connections. In this and other implementations, setting or adjusting the on/off channel dwell time of the repeater based on the TCP window sizes may include setting or adjusting the on/off channel dwell time of the repeater based on the average TCP window size. Setting or adjusting the on/off channel dwell time of the repeater based on the average TCP window size may include: setting or adjusting the on/off channel dwell time of the repeater to relatively longer on/off channel dwell times in response to the average TCP window size being relatively larger; or setting or adjusting the on/off channel dwell time of the repeater to relatively shorter on/off channel dwell times in response to the average TCP window size being relatively smaller.

Alternatively or additionally, setting or adjusting the on/off channel dwell time of the repeater based on the average TCP window size may include setting or adjusting the on/off channel dwell time of the repeater to relatively shorter on/off channel dwell times in response to the average TCP window size being relatively larger, to throttle the TCP streams.

In some implementations, the method 700 may include performing DPI to inspect upstream and downstream packets that contain TCP ACK packets. The method 700 may also include reducing overhead by coalescing TCP ACK packets. Reducing overhead by coalescing TCP ACK packets may include compressing multiple TCP ACK packets into a single TCP ACK packet. In some implementations, the method 700 may also include sending the single TCP ACK packet compressed from multiple TCP ACK packets as a last transmission prior to switching from an off channel to an on channel or from the on channel to the off channel.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple input multiple output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example or examples (e.g., example 2), or combined with aspects of another example. The following is a non-limiting summary of some example implementations presented herein.

An example method can include receiving, by a repeater configured to communicate according to a DBVC protocol, a transmission from a root AP; obtaining a next root AP TBTT of a next beacon to be sent by the root AP from the transmission; determining an amount of time to delay a next repeater TBTT of a next beacon to be sent by the repeater to avoid conflict between the next root AP TBTT and the next repeater TBTT; and delaying the next repeater TBTT based on the determined amount of time.

Another example method can include determining a load on an upstream buffer within a repeater that is configured to communicate according to a DBVC protocol, wherein the load on the upstream buffer corresponds to data to be transmitted within an upstream network; determining a load on a downstream buffer within the repeater that corresponds to data to be transmitted within a downstream network; determining whether to adjust DBVC duty cycles of the repeater based on the load on the upstream buffer and the load on the downstream buffer; and adjusting the DBVC duty cycles of the repeater.

A third example method can include determining traffic is to be transmitted by a first wireless communication device to a second wireless communication device configured to communicate according to a DBVC protocol during a period of time that the second wireless communication device is not to perform operations on a first channel; switching to a second channel; providing a trigger frame to the second wireless communication device over the second channel; receiving an ACK frame from the second wireless communication device, the ACK frame being sent by the second wireless communication device to the first wireless communication device in response to the second wireless communication device receiving the trigger frame; transmitting data to the second wireless communication device over the second channel; transmitting an end frame to the second wireless communication device over the second channel; and switching to the first channel in response to transmitting the end frame.

A fourth example method can include performing DPI to observe, at a repeater that is configured to communicate according to a DBVC protocol, TCP connections through the repeater and TCP window sizes of the TCP connections; and setting or adjusting an on/off channel dwell time of the repeater based on the TCP window sizes of the TCP connections.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving, by a repeater configured to communicate according to a dual band virtual concurrent (DBVC) protocol, a transmission from a root access point (AP);
obtaining a next root AP target beacon transmission time (TBTT) of a next beacon to be sent by the root AP from the transmission;
determining an amount of time to delay a next repeater TBTT of a next beacon to be sent by the repeater to avoid conflict between the next root AP TBTT and the next repeater TBTT; and
delaying the next repeater TBTT based on the determined amount of time,
wherein determining the amount of time to delay comprises:
determining the next repeater TBTT;
determining a repeater beacon interval of the repeater;
determining a first amount of time for the repeater to perform DBVC off channel operations;
determining a second amount of time that will cause the next repeater TBTT to avoid occurring during DBVC off channel operations of the repeater;
summing the next root AP TBTT with the repeater beacon interval to generate an intermediate sum; and
subtracting from the intermediate sum the first amount of time, the second amount of time, and the next repeater TBTT to generate a difference, the difference being the amount of time to delay.

2. The method of claim 1, further comprising setting the repeater beacon interval equal to a root AP beacon interval of the root AP such that repeater TBTTs that follow the next repeater TBTT are out of phase with root AP TBTTs that follow the next root AP TBTT.

3. The method of claim 1, further comprising setting the repeater beacon interval to a different value than a root AP beacon interval of the root AP such that at least some repeater TBTTs that follow the next repeater TBTT are out of phase with root AP TBTTs that follow the next root AP TBTT.

4. The method of claim 1, wherein delaying the next repeater TBTT based on the determined amount of time comprises delaying the next repeater TBTT by the determined amount of time.

5. The method of claim 1, wherein delaying the next repeater TBTT based on the determined amount of time comprises delaying the next repeater TBTT by a portion of the determined amount of time, the method further comprising delaying each of a plurality of subsequent repeater TBTTs that follow the next repeater TBTT by a portion of the determined amount of time, wherein a sum of the portions of the determined amount of time equals the determined amount of time.

6. A method comprising:
determining a load on an upstream buffer within a repeater that is configured to communicate according to a dual band virtual concurrent (DBVC) protocol, wherein the load on the upstream buffer corresponds to data to be transmitted within an upstream network;
determining a load on a downstream buffer within the repeater that corresponds to data to be transmitted within a downstream network;
determining whether to adjust a DBVC duty cycle of the repeater based on the load on the upstream buffer and the load on the downstream buffer, wherein the DBVC duty cycle includes at least one of:
an on channel duty cycle comprising a ratio of time spent on an on channel to total time spent on both the on channel and an off channel; and
an off channel duty cycle comprising a ratio of time spent on the off channel to total time spent on both the on channel and the off channel; and
adjusting the DBVC duty cycle of the repeater.

7. The method of claim 6, wherein the load on the downstream buffer comprises data to be sent by the repeater to one or more client devices within the downstream network.

8. The method of claim 6, wherein:
determining the load on the upstream buffer comprises identifying a priority of the data within the upstream buffer based on a type of the data within the upstream buffer and calculating the load on the upstream buffer based on the identified priority of the data within the upstream buffer, a given amount of data with higher priority contributing more to the determined load than a same amount of data with lower priority; and
determining the load on the downstream buffer comprises identifying a priority of the data within the downstream buffer based on a type of the data within the downstream buffer and calculating the load on the downstream buffer based on the identified priority of the data within the downstream buffer, a given amount of data with higher priority contributing more to the determined load than a same amount of data with lower priority.

9. The method of claim 8, wherein the priority of the data within the upstream buffer and the priority of the data within the downstream buffer is determined based on access categories associated with the data.

10. The method of claim 6, wherein determining whether to adjust the DBVC duty cycle of the repeater based on the load on the upstream buffer and the load on the downstream buffer comprises:
determining a ratio of the load on the upstream buffer to the load on the downstream buffer; and
one of:
determining to not adjust the DBVC duty cycle of the repeater if the ratio of the load on the upstream buffer to the load on the downstream buffer is within a predetermined range; or
determining to adjust the DBVC duty cycle of the repeater if the ratio of the load on the upstream buffer to the load on the downstream buffer is outside the predetermined range.

11. The method of claim 6, wherein:
determining the load on the upstream buffer comprises calculating a buffer size of the upstream buffer based on access category factors associated with the data and a number of packets within the load on the upstream buffer; and
determining the load on the downstream buffer comprises calculating a buffer size of the downstream buffer based on access category factors associated with the data and a number of packets within the load on the downstream buffer.

12. The method of claim 6, wherein adjusting the DBVC duty cycle of the repeater comprises adjusting at least one of:

a number of times per target beacon transmission time (TBTT) to switch between communication within the downstream network and the upstream network; or
an off channel dwell time of the repeater.

13. A method comprising:
determining traffic is to be transmitted by a first wireless communication device to a second wireless communication device configured to communicate according to a dual band virtual concurrent (DBVC) protocol during a period of time that the second wireless communication device is not to perform operations on a first channel;
switching to a second channel;
providing a trigger frame to the second wireless communication device over the second channel;
receiving an acknowledge (ACK) frame from the second wireless communication device, the ACK frame being sent by the second wireless communication device to the first wireless communication device in response to the second wireless communication device receiving the trigger frame;
transmitting data to the second wireless communication device over the second channel;
transmitting an end frame to the second wireless communication device over the second channel; and
switching to the first channel in response to transmitting the end frame.

14. The method of claim 13 further comprising:
receiving a second trigger frame from the second wireless communication device over the first channel according to the DBVC protocol during a period of time that the first wireless communication device is not to perform operations on the second channel;
receiving data from the second wireless communication device over the first channel; and
receiving a second end frame from the second wireless communication device, wherein the second end frame indicates that the second wireless communication device is to switch to the second channel.

15. The method of claim 13, further comprising receiving a second ACK frame from the second wireless communication device in response to the end frame.

16. The method of claim 13, further comprising:
providing one or more other trigger frames to the second wireless communication device over the second channel prior to providing the trigger frame; and
determining that an ACK frame has not been received from the second wireless communication device for the one or more other trigger frames,
wherein the first wireless communication device provides the trigger frame to the second wireless communication device in response determining that an ACK frame has not been received from the second wireless communication device for the one or more other trigger frames.

17. The method of claim 13, further comprising:
switching to the second channel;
providing a plurality of trigger frames to the second wireless communication device over the second channel;
determining that an ACK frame has not been received from the second wireless communication device for any of the plurality of trigger frames;
switching back to the first channel; and
communicating with the second wireless communication device over the first channel.

18. The method of claim 13, wherein the first wireless communication device comprises a root AP and the second wireless communication device comprises a repeater configured to communicate with the root AP within an upstream network and with a client device within a downstream network according to the DBVC protocol.

19. A method comprising:
performing deep packet inspection (DPI) to observe, at a repeater that is configured to communicate according to a dual band virtual concurrent (DBVC) protocol, transmission control protocol (TCP) connections through the repeater and TCP window sizes of the TCP connections; and
setting or adjusting an on/off channel dwell time of the repeater based on the TCP window sizes of the TCP connections.

20. The method of claim 19, further comprising determining an average TCP window size of the TCP window sizes of the TCP connections, wherein setting or adjusting the on/off channel dwell time of the repeater based on the TCP window sizes comprises setting or adjusting the on/off channel dwell time of the repeater based on the average TCP window size.

21. The method of claim 20, wherein setting or adjusting the on/off channel dwell time of the repeater based on the average TCP window size comprises:
setting or adjusting the on/off channel dwell time of the repeater to relatively longer on/off channel dwell times in response to the average TCP window size being relatively larger;
setting or adjusting the on/off channel dwell time of the repeater to relatively shorter on/off channel dwell times in response to the average TCP window size being relatively smaller; or
setting or adjusting the on/off channel dwell time of the repeater to relatively shorter on/off channel dwell times in response to the average TCP window size being relatively larger to throttle TCP streams.

22. The method of claim 19, further comprising:
performing DPI to inspect upstream and downstream packets that contain TCP acknowledge (ACK) packets; and
reducing overhead by coalescing TCP ACK packets.

23. The method of claim 22, wherein reducing overhead by coalescing TCP ACK packets comprises compressing multiple TCP ACK packets into a single TCP ACK packet.

24. The method of claim 23, further comprising sending the single TCP ACK packet compressed from multiple TCP ACK packets as a last transmission prior to switching from an off channel to an on channel or from the on channel to the off channel.

* * * * *